United States Patent
Xie et al.

(10) Patent No.: US 11,352,102 B2
(45) Date of Patent: Jun. 7, 2022

(54) NET HAULER FOR TRAWLER

(71) Applicant: ZHEJIANG OCEAN UNIVERSITY, Zhoushan (CN)

(72) Inventors: Yonghe Xie, Zhoushan (CN); Guibiao Wang, Zhoushan (CN); Wei Wang, Zhoushan (CN); Lijun Wang, Zhoushan (CN)

(73) Assignee: ZHEJIANG OCEAN UNIVERSITY, Zhoushan (CN)

( * ) Notice: Subject to any disclaimer, the term of this patent is extended or adjusted under 35 U.S.C. 154(b) by 74 days.

(21) Appl. No.: 17/113,015

(22) Filed: Dec. 5, 2020

(65) Prior Publication Data
US 2021/0171161 A1 Jun. 10, 2021

(30) Foreign Application Priority Data
Dec. 6, 2019 (CN) .......................... 201911243041.2

(51) Int. Cl.
| | | |
|---|---|---|
| B63B 35/08 | (2006.01) | |
| A01K 73/06 | (2006.01) | |
| B66D 1/36 | (2006.01) | |
| B63B 35/18 | (2006.01) | |
| B66D 1/12 | (2006.01) | |
| B66D 1/30 | (2006.01) | |

(52) U.S. Cl.
CPC .............. *B63B 35/18* (2013.01); *A01K 73/06* (2013.01); *B66D 1/12* (2013.01); *B66D 1/30* (2013.01); *B66D 2700/0141* (2013.01); *B66D 2700/0183* (2013.01)

(58) Field of Classification Search
CPC . A01K 73/06; B66D 1/28; B66D 1/12; B66D 1/30; B66D 2700/0141; B66D 2700/0183; B66D 2700/0166; B66D 2700/0191; B66D 2700/025; B63B 35/18; B63B 35/20
See application file for complete search history.

(56) References Cited

U.S. PATENT DOCUMENTS 685,249 A * 10/1901 Bozarth .................... B66D 1/36
254/389
837,173 A * 11/1906 Yancey .................. A01K 73/06
254/371
(Continued)

FOREIGN PATENT DOCUMENTS

| CN | 101948016 A | 1/2011 |
| CN | 201980387 U | 9/2011 |

(Continued)

*Primary Examiner* — Michael E Gallion
(74) *Attorney, Agent, or Firm* — True Shepherd LLC; Andrew C. Cheng

(57) ABSTRACT

The present disclosure belongs to the technical field of fishing operation equipment in fishery, and relates to a net hauler for a trawler. The net hauler includes two rope drums, a drum rotation shaft is disposed on each rope drum and includes a first rotation shaft and a second rotation shaft, a drum is disposed on the first rotation shaft, a cylindrical housing is disposed between two ends of the first rotation shaft and the second rotation shaft, a pivot is disposed on the cylindrical housing. The present disclosure has advantages of changing a net hauling speed and improving a fishing efficiency.

6 Claims, 5 Drawing Sheets

(56) References Cited

U.S. PATENT DOCUMENTS

| | | | | |
|---|---|---|---|---|
| 919,107 | A * | 4/1909 | Yancey | A01K 73/06 254/359 |
| 948,760 | A * | 2/1910 | Gierke | A01K 73/06 254/371 |
| 1,461,141 | A * | 7/1923 | Depew | A01K 73/06 254/371 |
| 2,924,430 | A * | 2/1960 | Smith | B66D 3/24 192/223.1 |
| 3,047,973 | A * | 8/1962 | Puretic | A01K 73/06 43/8 |
| 3,180,622 | A * | 4/1965 | Fillion | B63B 35/18 212/258 |
| 3,298,462 | A * | 1/1967 | Morris | B66D 1/14 212/199 |
| 3,300,189 | A * | 1/1967 | Blount | A01K 73/06 254/303 |
| 3,332,664 | A * | 7/1967 | Luketa | B66D 1/26 242/388.6 |
| 3,465,901 | A * | 9/1969 | Grabowski | A01K 69/08 414/599 |
| 3,559,817 | A * | 2/1971 | Brown | B66C 13/18 91/453 |
| 3,568,468 | A * | 3/1971 | Dechantsreiter et al. | B66D 1/28 254/285 |
| 3,603,016 | A * | 9/1971 | Ursich | A01K 73/06 43/8 |
| 3,643,921 | A * | 2/1972 | Puretic | A01K 73/06 254/371 |
| 3,662,484 | A * | 5/1972 | Dres | B63B 35/20 43/4.5 |
| 3,671,016 | A * | 6/1972 | Gladysz | B66D 1/28 242/157.1 |
| 3,687,418 | A * | 8/1972 | Halvorsen | B66D 1/741 414/142.8 |
| 3,793,760 | A * | 2/1974 | Puretic | A01K 73/06 43/4.5 |
| 3,985,339 | A * | 10/1976 | Bjorshol | B29C 65/565 254/295 |
| 4,151,981 | A * | 5/1979 | Gennep | B66D 3/18 254/375 |
| 4,204,354 | A * | 5/1980 | Kane | A01K 73/06 43/4.5 |
| 4,580,766 | A * | 4/1986 | Woodgate | A01K 73/06 254/389 |
| 4,635,903 | A * | 1/1987 | Broyden | B66D 3/26 254/362 |
| 5,074,528 | A * | 12/1991 | Long, Jr. | B66D 1/54 254/290 |
| 5,310,152 | A * | 5/1994 | O'Neill | A47B 81/06 248/329 |
| 5,351,430 | A * | 10/1994 | Hystad | B66D 1/50 254/273 |
| 5,445,426 | A * | 8/1995 | Sorensen | B66C 1/10 294/81.5 |
| 5,562,394 | A * | 10/1996 | Brown, Jr. | B66C 1/66 414/626 |
| 6,179,270 | B1 * | 1/2001 | Higdon | B66D 3/16 254/362 |
| 6,241,215 | B1 * | 6/2001 | Gersemsky | B66D 3/22 254/362 |
| 6,554,255 | B2 * | 4/2003 | Fujikawa | B66D 3/16 254/342 |
| 7,014,172 | B2 * | 3/2006 | Kataoka | B66D 3/18 254/338 |
| 8,006,958 | B2 * | 8/2011 | Starks | B66D 3/20 254/323 |
| 8,708,314 | B2 * | 4/2014 | Scott | A22B 7/002 254/266 |
| 9,758,340 | B1 * | 9/2017 | Reese | B65H 59/04 |
| 9,802,800 | B2 * | 10/2017 | Kalakay, Jr. | A01G 23/006 |
| D874,782 | S * | 2/2020 | Detering | D34/33 |
| 10,569,997 | B1 * | 2/2020 | Fusillo | B66D 3/06 |
| 10,815,102 | B2 * | 10/2020 | Dodd | B66C 1/34 |
| 2005/0230670 | A1 * | 10/2005 | Kataoka | B66D 3/26 254/335 |
| 2011/0193037 | A1 * | 8/2011 | Smith | B66D 3/18 254/266 |
| 2012/0018689 | A1 * | 1/2012 | Chepurny | A61G 7/1015 254/342 |
| 2014/0138340 | A1 * | 5/2014 | Miller | B66D 3/04 254/338 |
| 2014/0291030 | A1 * | 10/2014 | Urquhart | E21B 19/24 175/203 |
| 2016/0057980 | A1 * | 3/2016 | Drolet | A01K 75/00 242/390.8 |
| 2018/0257917 | A1 * | 9/2018 | Hall | B66D 1/22 |
| 2020/0062368 | A1 * | 2/2020 | Remøy | B63H 25/52 |
| 2020/0317478 | A1 * | 10/2020 | Shin | B66D 1/48 |
| 2020/0354025 | A1 * | 11/2020 | Stuart | A01K 69/06 |
| 2021/0061626 | A1 * | 3/2021 | Rusiniak | B66D 1/38 |
| 2021/0309498 | A1 * | 10/2021 | Jackson | B66C 13/40 |

FOREIGN PATENT DOCUMENTS

| | | |
|---|---|---|
| CN | 203860276 U | 10/2014 |
| CN | 110367212 A | 10/2019 |
| JP | 2004261178 A | 9/2004 |
| SU | 566545 A1 | 8/1977 |
| SU | 1373385 A1 | 2/1988 |

* cited by examiner

C-C

NET HAULER FOR TRAWLER

CROSS-REFERENCE TO RELATED APPLICATIONS

This application claims priority to Chinese Patent Application No. 201911243041.2 with a filing date of Dec. 6, 2019. The content of the aforementioned application, including any intervening amendments thereto, are incorporated herein by reference.

TECHNICAL FIELD

The present disclosure belongs to the technical field of fishing operation equipment in fishery, and particularly relates to a net hauler for a trawler.

BACKGROUND

A net hauling process of a trawler may be divided into three stages. At the first stage, nets are straightened out sequentially and placed at a rear end of a net hauler. At the second stage, the nets are placed slowly into sea and opened sequentially behind the stern of the trawler to perform a dragging operation. At the third stage, the nets are gradually hauled back onto a stern deck of the trawler by a hydraulic motor supplying power. The existing trawler supplies a driving force by only one hydraulic motor with low output power and the hydraulic motor within a given rotation speed range is difficult to regulate in speed, affecting the net hauling efficiency and bringing much inconvenience to users.

SUMMARY

To solve the above problems in the prior art, the present disclosure provides a net hauler for a trawler. Technical problems to be solved by the present disclosure are: how to change a net hauling speed and improve a fishing efficiency.

The present disclosure may be achieved by the following technical solution. A net hauler for a trawler includes two rope drums disposed at left and right sides. A drum rotation shaft is axially disposed on each of the rope drums and includes a first rotation shaft and a second rotation shaft which are coaxially disposed, a drum is coaxially fixed on the first rotation shaft, a cylindrical housing is coaxially fixed between two opposing ends of the first rotation shaft and the second rotation shaft, a pivot is axially and rotatably disposed on the cylindrical housing, and a driving mechanism capable of driving the pivot to rotate is disposed in the cylindrical housing; at least one circular plate is coaxially fixed on the pivot, a plurality of sliding grooves are uniformly opened on a side surface of the circular plate around the pivot, an inner wall at one end of each sliding groove penetrates through an edge of the circular plate, and the other end of the sliding groove extends toward a middle part of the circular plate; a sliding arm is slidably disposed on each sliding groove, a plurality of positioning holes corresponding to the sliding arms are opened on the cylindrical housing, and the other end of the sliding arm protrudes out of the corresponding positioning hole and is fixedly provided with an arc plate; and a rope with a free end connected with a trawling net is wound on the drum.

In the above net hauler for a trawler, a controller is further included; a first water flow ejector with a water spray mouth facing backward is disposed at a tail of the trawling net, and the first water flow ejector is electrically connected with the controller through a power supply.

In the above net hauler for a trawler, an air bag is disposed around the tail of the trawling net, an air compression cylinder is disposed on the air bag, and a discharge end of the air compression cylinder is in communication with the air bag and has a solenoid valve which is in electrical connection with the controller through the power supply.

In the above net hauler for a trawler, a shifter lever is fixed at an edge of each arc plate close to the drum.

In the above net hauler for a trawler, a vertically-downward lower baffle plate is fixed at left and right edges of each arc plate respectively.

In the above net hauler for a trawler, the driving mechanism includes a worm wheel coaxially fixed on the pivot, a motor is fixed at an inner wall of the cylindrical housing, and an output shaft of the motor is transmission-connected with a worm screw engaged with the worm wheel.

In the above net hauler for a trawler, a circular pipe uniformly provided with several second water flow ejectors is disposed around the trawling net, and a water ejection mouth of the second water flow ejector is disposed toward the tail of the trawling net; the second water flow ejector is electrically connected with the controller through the power supply.

In the above net hauler for a trawler, the circular pipe has a hollow cavity, and the circular pipe is made of high-density polystyrene.

In the above net hauler for a trawler, a hair brush is disposed on an inner side surface of the circular pipe through a hair brush holder, and the tip of the hair brush extends into the trawling net.

In the above net hauler for a trawler, a connection rope is connected between a front end of the trawling net and the circular pipe.

Compared with the prior art, the net hauler of the present disclosure has the following advantages.

1. When the trawling net is lowered into seawater for fishing, the rope on the arc plate is completely separated and connected with the front end of the trawling net through the rope on the drum. After the trawling net completes fishing, the driving mechanism is started according to a desired net hauling speed to drive the circular plate to rotate through the pivot. At this time, the sliding groove on the circular plate moves to enable each sliding arm to extend out of and into the corresponding positioning hole under the action of the sliding groove. At the same time, the sliding arm drives the arc plate to increase and decrease a distance between the arc plate and an axis of the pivot. In this case, the arc plate changes its linear speed under the same rotation speed so as to adjust the speed of taking back the rope. In the process of taking back the trawling net, the hydraulic motor drives the drum rotation shaft through a driving gear, and the drum rotation shaft drives the drum and six arc plates to rotate synchronously. With the increase of the rope wound on the drum, the rope already wound on the drum squeezes the rope to be wound on the rope drum onto the arc plate. In addition, a gap is formed between two adjacent arc plates. After the rope is wound on the arc plate, the edge of the arc plate and the rope are squeezed each other to increase a frictional force between the rope and the arc plate, so that the rope already wound on six arc plates is uneasy to slip. At the same time, since the above frictional force is greater than the frictional force of the rope on the drum, the rope is separated more easily from the drum and then wound on six arc plates. Hence, the rope on the drum is returned gradually to the arc plate so that the arc plate takes back the trawling net through the rope, thereby adjusting the net hauling speed. In the above process, the distance from each arc plate to the axis of the pivot is changed to enable the arc plate to have a different linear speed under the same rotation speed of the drum rotation shaft, thereby increasing or decreasing the speed of winding the rope on the rope drum, changing the net hauling speed, and effectively improving the fishing efficiency.

2. Upon start, the first water flow ejector sucks external seawater and ejects the seawater backward, so that the tail of the trawling net is subjected to a forward reactive force generated by the seawater and thus pushed to move forward. The structure further improves the efficiency of taking back the trawling net, increasing the net hauling speed, and also reducing a pulling force received by the rope at the same time.

3. The air compression cylinder inflates the air bag to expand it. A buoyancy force generated by the air bag brings the tail of the trawling net to float upward, so that the tail of the trawling net is gradually flush with the front end of the trawling net, reducing the contact area of the trawling net and water, diminishing the resistance of water against the moving trawling net, and facilitating improving the speed of taking back the trawling net.

4. Upon start, the second water flow ejector sucks the external seawater and ejects water flow toward the tail of the trawling net, and the ejected water flow washes aquatic products attached to the trawling net to enable them to flow toward the middle part of the trawling net; at the same time, since the reactive force generated by the seawater acts on the circular pipe to push the circular pipe to move forward, an inner side surface of the circular pipe contacts and squeezes the trawling net to move forward while gradually drawing in the trawling net to reduce a transverse area of the trawling net, thereby reducing the resistance of water against the trawling net. In addition to removing the aquatic products attached to the trawling net, the structure also can facilitate increasing the net hauling speed, thereby improving the fishing efficiency of the net hauler.

5. The disposal of the hair brush facilitates further removing the aquatic products attached to the trawling net, and the combination of the hair brush and the second water flow ejector significantly improves the efficiency of removing the aquatic products attached to the trawling net.

Numerals of the drawings are described as follows: 1. rope drum, 11. frame, 12. drum rotation shaft, 121. first rotation shaft, 122. second rotation shaft, 123. driving gear, 13. drum, 14. rope, 15. outer baffle plate, 16. hull stern, 2. cylindrical housing, 21. pivot, 22. worm wheel, 23. circular plate, 231. sliding groove, 24. sliding arm, 25. arc plate, 251. lower baffle plate, 252. gap, 26. worm screw, 261. mounting seat, 27. positioning hole, 28. shifter lever, 29. motor, 3. pulley frame, 4. trawling net, 5. first water flow ejector, 6. air bag, 61. air compression cylinder, 62. solenoid valve, 7. controller, 8. circular pipe, 81. second water flow ejector, 82. hair brush, 821. hair brush holder, 83. connection rope, 84. hollow cavity.

DETAILED DESCRIPTION OF THE EMBODIMENTS

The following descriptions are specific examples of the present disclosure, and the technical solutions of the present disclosure will be further described in combination with accompanying drawings. However, the present disclosure is not limited to these examples.

Figure 1:
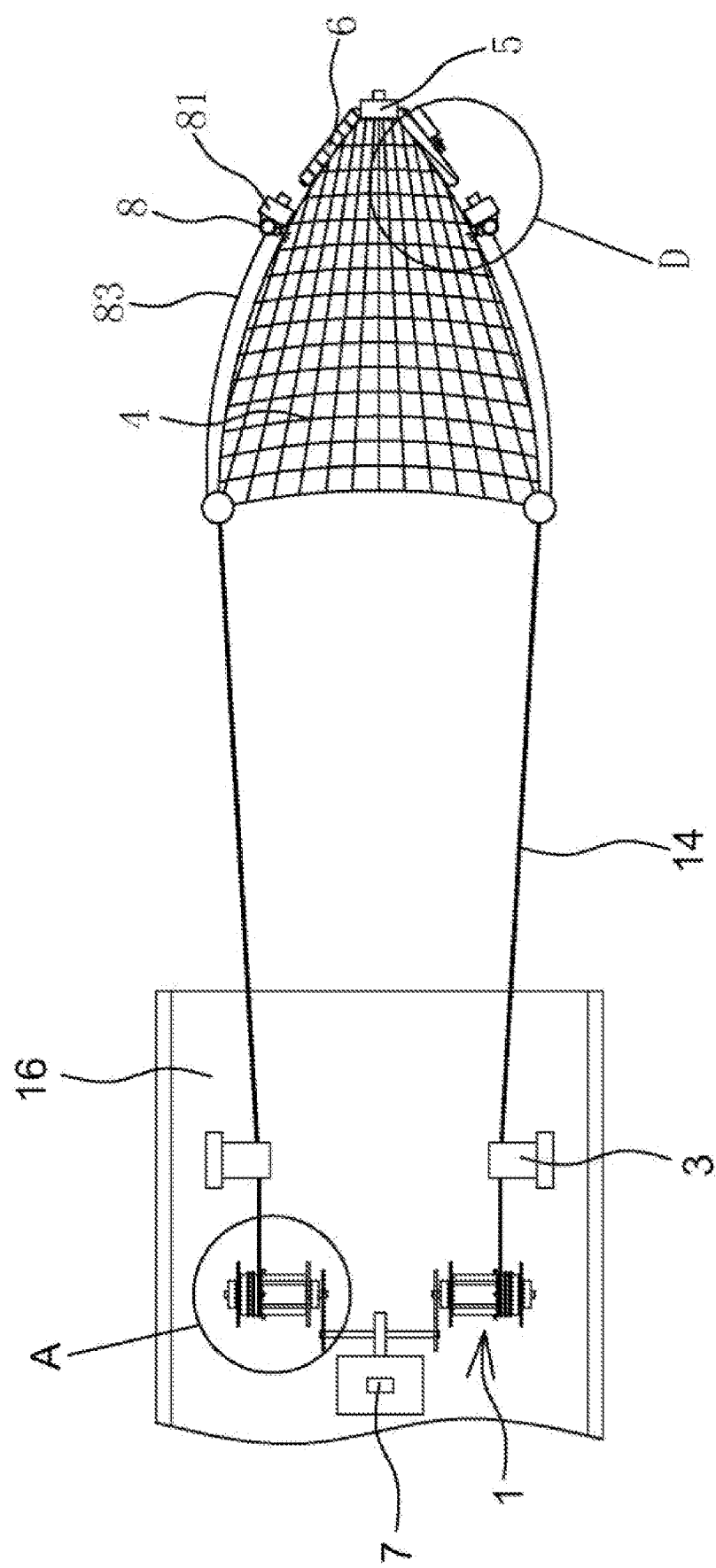
FIG. 1 is a structural sectional view of the present disclosure.
Figure 2:
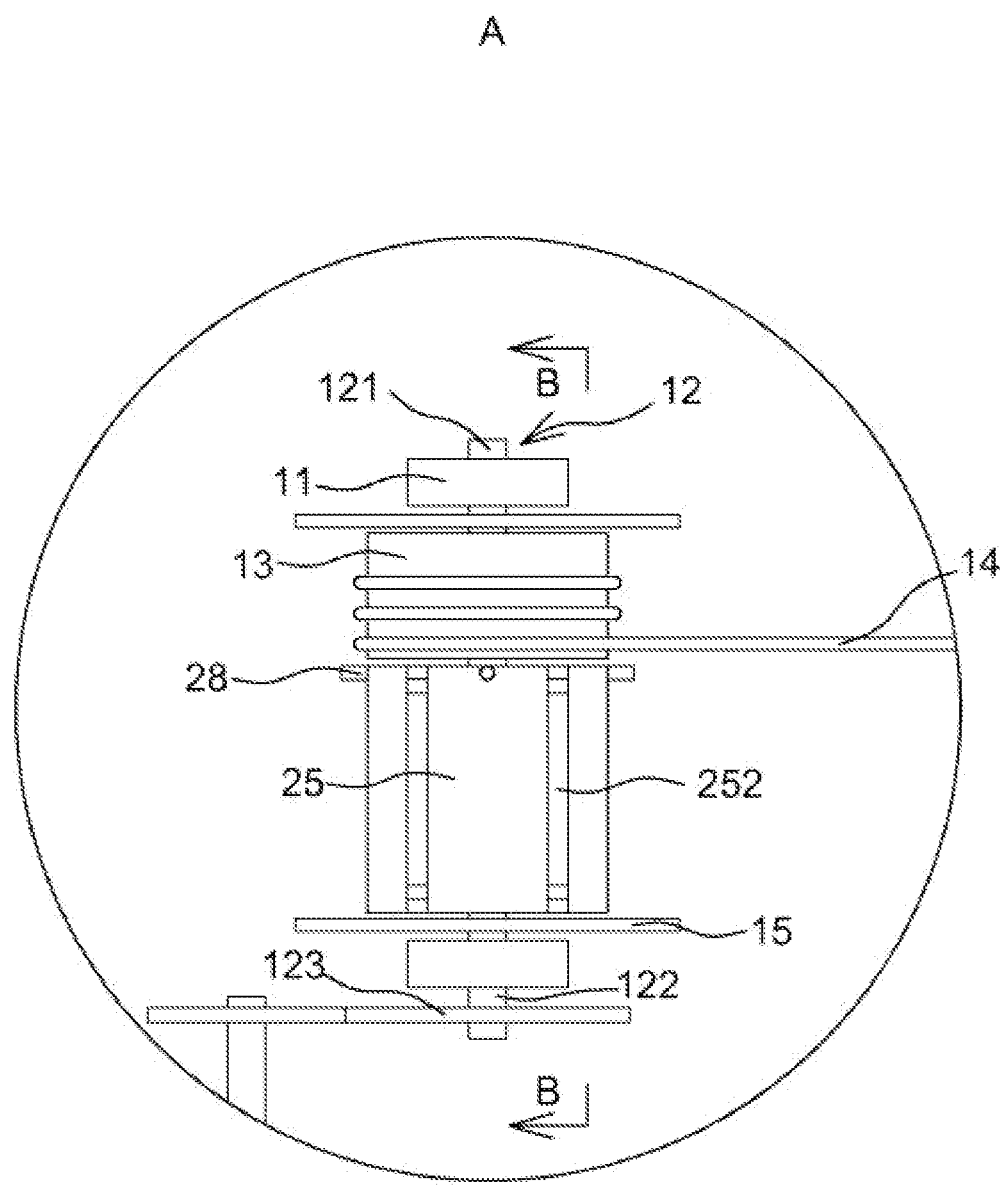
FIG. 2 is a partial enlarged view at the position A in FIG. 1.
Figure 3:
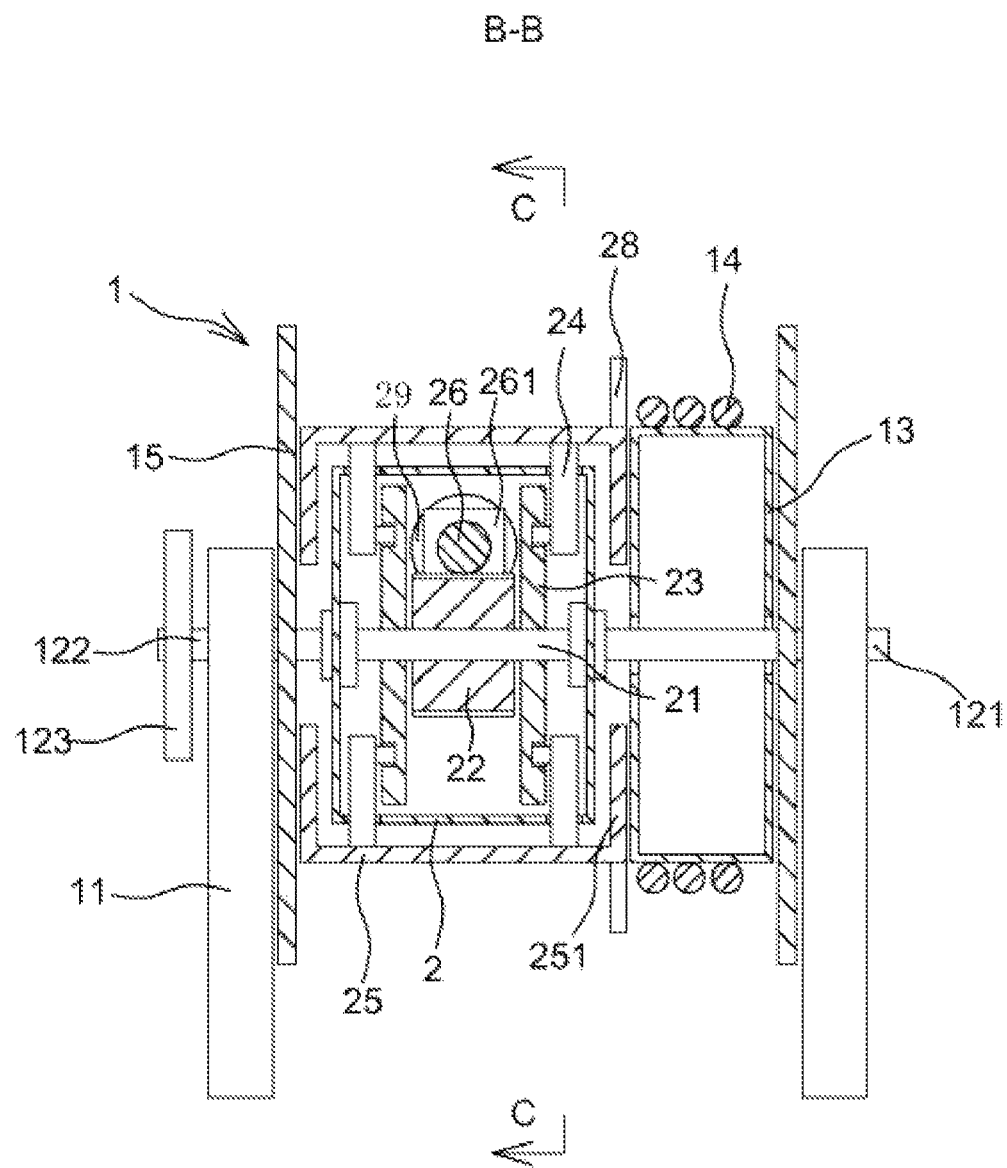
FIG. 3 is a structural sectional view taken along B-B in FIG. 2.
Figure 4:
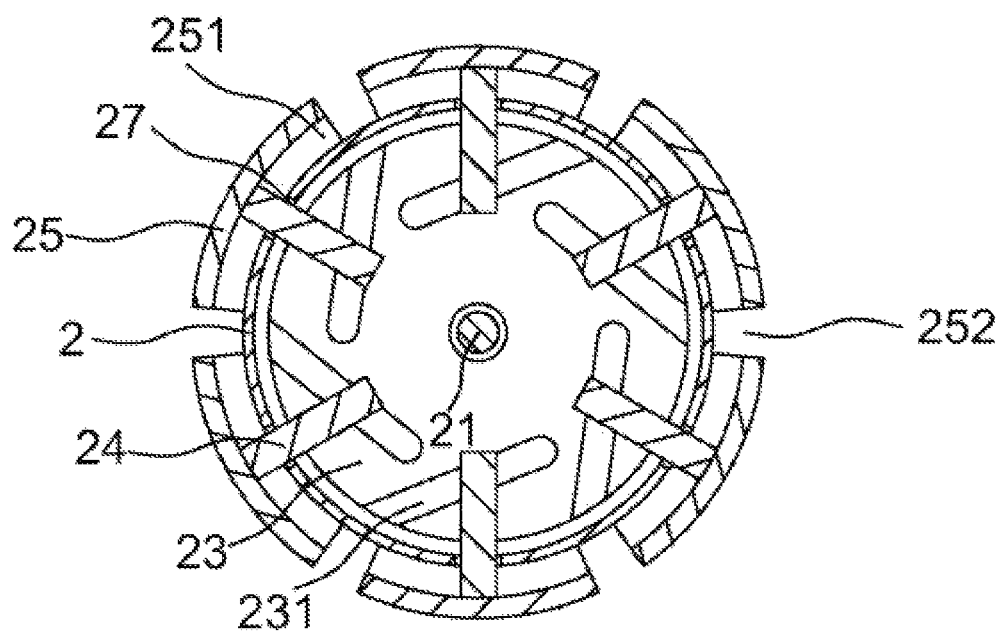
FIG. 4 is a structural sectional view taken along C-C in FIG. 3.
Figure 5:
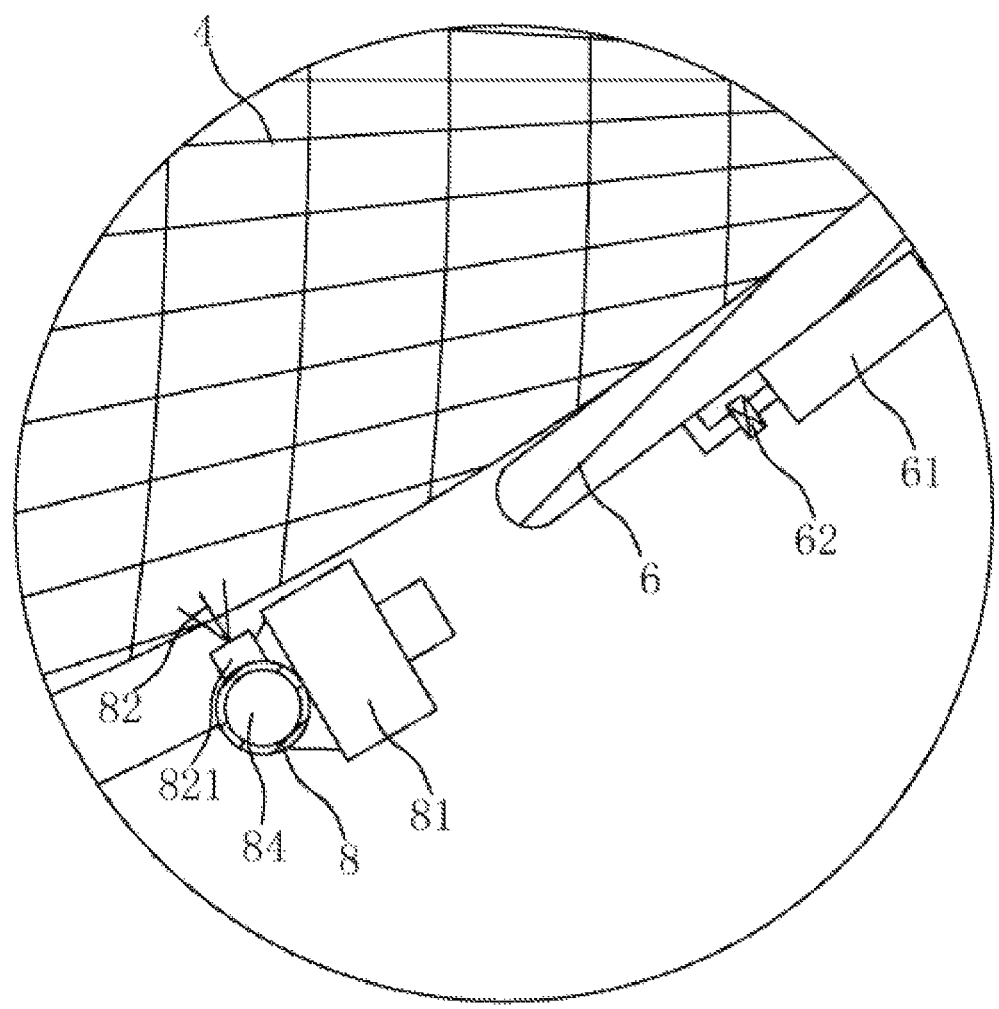
FIG. 5 is a partial enlarged view at the position D in FIG. 1.

As shown in FIGS. 1-5, a net hauler for a trawler includes two rope drums 1 disposed at left and right sides of a hull stern 16 respectively. The rope drum 1 has a frame 11 fixed on the hull stern 16, and is mounted on the frame 11; a drum rotation shaft 12 is axially disposed on each rope drum 1 and includes a first rotation shaft 121 and a second rotation shaft 122 which are coaxially disposed, and a drum 13 is coaxially fixed on the first rotation shaft 121; a driving gear 123 is coaxially fixed on the second rotation shaft 122, and transmission-connected with an output shaft of a hydraulic motor disposed on the hull stern 16; a cylindrical housing 2 is coaxially fixed between two opposing ends of the first rotation shaft 121 and the second rotation shaft 122, a pivot 21 is axially and rotatably disposed on the cylindrical housing 2, and a driving mechanism capable of driving the pivot 21 to rotate is disposed in the cylindrical housing 2; two circular plates 23 are coaxially fixed on the pivot 21, and six sliding grooves 231 are uniformly opened on a side surface of each circular plate 23 around the pivot 21, an inner wall at one end of each sliding groove 231 penetrates through an edge of the circular plate 23, and the other end of the sliding groove 231 extends toward a middle part of the circular plate 23; a sliding arm 24 is slidably disposed on each sliding groove 231, six positioning holes 27 corresponding to the sliding arms 24 are opened on the cylindrical housing 2, and the other end of the sliding arm 24 protrudes out of the corresponding positioning hole 27 to be fixedly provided with an arc plate 25; a rope 14 is wound on the drum 13, and a free end of the rope 14 is connected with a trawling net 4 through a pulley frame 3 disposed on the hull stern 16; two outer baffle plates 15 are coaxially fixed on the drum rotation shaft 12, and are located at both sides of the drum 13 and the arc plate 25 respectively.

In the process of lowering the trawling net 4 into seawater for fishing, the rope 14 is completely separated from the arc plate 25 and connected with the front end of the trawling net 4 through the rope on the drum 13. After the trawling net 4 completes fishing, the driving mechanism is started according to a desired net hauling speed to drive a circular plate 23 to rotate through the pivot 21. At this time, the sliding groove 231 on the circular plate 23 moves to enable each sliding arm 24 to extend out of and into the corresponding positioning hole 27 under the action of the sliding groove 231. At the same time, the sliding arm 24 drives the arc plate 25 to increase and decrease a distance between the arc plate 25 and an axis of the pivot 21. In this case, the arc plate 25 changes its linear speed under the same rotation speed so as to adjust the speed of taking back the rope. In the process of taking back the trawling net 4, the hydraulic motor drives the drum rotation shaft 12 through the driving gear 123, so that the drum rotation shaft 12 drives the drum 13 and six arc plates 25 to rotate synchronously. With the increase of the rope 14 wound on the drum 13, the rope 14 already wound on the drum 13 squeezes the rope 14 to be wound on the rope drum onto the arc plate 25. In addition, a gap 252 is formed between two adjacent arc plates 25. After the rope 14 is wound on the arc plate 25, the edge of the arc plate 25 and the rope 14 are squeezed each other to increase a frictional force between the rope 14 and the arc plate 25, so that the rope 14 already wound on six arc plates 25 is uneasy to slip. At the same time, since the above frictional force is greater than the frictional force of the rope 14 on the drum 13, the rope 14 on the drum 13 is more easily separated from the drum 13 and wound on six arc plates 25. The rope on the drum 13 is gradually returned to the arc plate 25 so that the arc plate 25 takes back the trawling net 4 through the rope 14, thereby adjusting the net hauling speed.

In the above process, the distance from each arc plate 25 to the axis of the pivot 21 is changed to enable the arc plate 25 to have a different linear speed under the same rotation speed of the drum rotation shaft 12, thereby increasing or decreasing the speed of winding the rope 14 on the rope drum 1, further changing the net hauling speed, and effectively improving the fishing efficiency.

Specifically, the net hauler of the present disclosure further includes a controller 7 disposed on the hull stern 16; a first water flow ejector 5 with a water spray mouth facing backward is disposed at a tail of the trawling net 4, and the first water flow ejector 5 is electrically connected with the controller 7 through a power supply; the power supply may be electric energy generated by a power generator on the hull stern 16.

In the process of taking back the trawling net 4, the controller 7 sends an electrical signal to the first water flow ejector 5 to control on and off of the first water flow ejector 5. When the first water flow ejector 5 is turned on, the first water flow ejector 5 sucks external seawater and ejects the seawater backward, so that the tail of the trawling net 4 is subjected to a forward reactive force generated by the seawater and thus pushed to move forward.

The structure further improves the efficiency of taking back the trawling net 4, increasing the net hauling speed, and also reducing a pulling force received by the rope 14 at the same time.

Specifically, an air bag 6 is disposed around the tail of the trawling net 4, an air compression cylinder 61 is disposed on the air bag 6, a discharge end of the air compression cylinder 61 is in communication with the air bag 6 and has a solenoid valve 62 which is in electrical connection with the controller 7 through the power supply.

In the process of taking back the trawling net 4, the controller 7 sends an electrical signal to the solenoid valve 62 to control opening and closing of the solenoid valve 62. When the solenoid valve 62 is opened, the air compression cylinder 61 inflates the air bag 6 to expand it. A buoyancy force generated by the air bag 6 drives the tail of the trawling net 4 to float upward, so that the tail of the trawling net 4 is gradually flush with the front end of the trawling net 4, reducing the contact area of the trawling net 4 and water, diminishing the resistance of water against the trawling net 4, and facilitating improving the speed of taking back the trawling net 4.

Specifically, a shifter lever 28 is fixed at an edge of each arc plate 25 close to the drum 13.

The disposal of the shifter lever 28 facilitates shifting the rope 14 from the drum 13 back to six arc plates 25 when the rope drum 1 takes back the rope 14; in addition, the shifter lever 28 may further prevent the rope 14 from accidentally slipping onto the drum 13 accidentally.

Specifically, a vertically-downward lower baffle plate 251 is fixed at left and right edges of each arc plate 25 respectively.

The disposal of the lower baffle plate 251 prevents the rope 14 from slipping into a space below the arc plate 25.

Specifically, the driving mechanism includes a worm wheel 22 coaxially fixed on the pivot 21, a motor 29 is fixed on an inner wall of the cylindrical housing 2, an output shaft of the motor 29 is transmission-connected with a worm screw 26, both ends of the worm screw 26 are disposed in the cylindrical housing 2 through a mounting seat 261 respectively, and the worm screw 26 is engaged with the worm wheel 22; the motor 29 is a stepping motor.

When the driving mechanism is started, the output shaft of the motor 29 drives the worm screw 26 to rotate, the worm screw 26 then drives the pivot 21 through the worm wheel 22, and the pivot 21 then drives the circular plate 23 to rotate. In this way, the sliding arm 24 may extend out of and into the positioning hole 27.

Specifically, a circular pipe 8 uniformly provided with two second water flow ejectors 81 is disposed around the trawling net 4, and a water spray mouth of the second water flow ejector 81 faces toward the tail of the trawling net 4; the second water flow ejector 81 is electrically connected with the controller 7 through the power supply.

In the process of taking back the trawling net 4, the controller 7 sends an electrical signal to the second water flow ejector 81 to control on and off of the second water flow ejector 81. After being started, the second water flow ejector 81 sucks external seawater and ejects water flow toward the tail of the trawling net 4, and the ejected water flow washes aquatic products attached to the trawling net 4 to enable the aquatic products to flow toward the middle part of the trawling net 4; at the same time, since the reactive force generated by the seawater acts on the circular pipe 8 to push the circular pipe 8 to move forward, an inner side surface of the circular pipe 8 contacts and squeezes the trawling net 4 to move forward while gradually drawing in the trawling net 4 to reduce a transverse area of the trawling net 4, thereby reducing the resistance of water against the trawling net 4.

In addition to removing the aquatic products attached to the trawling net 4, the structure also facilitates increasing the net hauling speed, thereby improving the fishing efficiency of the net hauler of the present disclosure.

Specifically, the circular pipe 8 has a hollow cavity 84, and the circular pipe 8 is made of high-density polystyrene.

The structure facilitates increasing the buoyancy force of the circular pipe 8. The buoyancy force generated by the circular pipe 8 facilitates driving the trawling net 4 to float upward, thereby reducing the contact area of the trawling net 4 and the seawater, and further reducing the resistance of water against the trawling net 4.

Specifically, a hair brush 82 is disposed on an inner side surface of the circular pipe 8 through an annular hair brush holder 821, and a tip of the hair brush 82 extends into the trawling net 4.

The disposal of the hair brush 82 facilitates further removing the aquatic products attached to the trawling net 4, and the combination of the hair brush 82 and the second water flow ejector 81 significantly improves the efficiency of removing the aquatic products attached to the trawling net 4.

Specifically, a connection rope 83 is connected between the front end of the trawling net 4 and the circular pipe 8.

The disposal of the connection rope 83 facilitates the connection between the circular pipe 8 and the trawling net 4.

The specific examples described herein are merely illustrative of the spirit of the present disclosure. Persons skilled in the art may make various modifications or supplementations or substitutions in a similar manner to the described specific examples without departing from the spirit of the present disclosure or surpassing the scope defined in the appended claims.

We claim:

1. A net hauler for a trawler, comprising two rope drums (1) disposed at left and right sides, wherein a drum rotation shaft (12) is axially disposed on each rope drum (1), wherein each of the drum rotation shafts comprises: a first rotation shaft (121) and a second rotation shaft (122) which are coaxially disposed, a drum (13) being coaxially fixed on the first rotation shaft (121), a cylindrical housing (2) being coaxially fixed between two opposing ends of the first rotation shaft (121) and the second rotation shaft (122), a pivot (21) being axially and rotatably disposed on each of the cylindrical housing (2), and a driving mechanism capable of driving the pivot (21) to rotate and is disposed in the cylindrical housing (2), at least one circular plate (23) being coaxially fixed on the pivot (21), a plurality of sliding grooves (231) are uniformly opened on a side surface of the circular plate (23) around the pivot (21), an inner wall at one end of each sliding groove (231) penetrates through an edge of the circular plate (23), and the other end of each sliding groove (231) extends toward a middle part of the circular plate (23), a sliding arm (24) is slidably disposed on each of the sliding grooves (231), a plurality of positioning holes (27) corresponding to the sliding arms (24) are disposed on the cylindrical housing (2), and an end of the sliding arm (24) protrudes out of the corresponding positioning hole (27) to be fixedly provided with an arc plate (25), a rope (14) with a free end connected with a trawling net (4) being wound on each of the drums (13).

2. The net hauler for a trawler according to claim 1, further comprising a controller (7), wherein a first water flow ejector (5) with a water spray mouth facing backward is disposed at a tail of the trawling net (4), and the first water flow ejector (5) is electrically connected with the controller (7) through a power supply.

3. The net hauler for a trawler according to claim 2, wherein an air bag (6) is disposed around the tail of the trawling net (4), an air compression cylinder (61) is disposed on the air bag (6), a discharge end of the air compression cylinder (61) is in communication with the air bag (6) and has a solenoid valve (62) which is electrically connected with the controller (7) through the power supply.

4. The net hauler for a trawler according to claim 3, wherein a shifter lever (28) is fixed at an edge of each of the arc plate (25) close to each of the drums (13).

5. The net hauler for a trawler according to claim 4, wherein a vertically-downward lower baffle plate (251) is fixed at left and right edges of each of the arc plates (25) respectively.

6. The net hauler for a trawler according to claim 5, wherein each of the driving mechanisms comprises a worm wheel (22) coaxially fixed on each of the pivots (21), a motor (29) being fixed on an inner wall of the cylindrical housing (2), an output shaft of the motor (29) being connected with a worm screw (26) engaged with each of the worm wheel (22).

* * * * *